United States Patent [19]
Toma et al.

[11] 4,043,161
[45] Aug. 23, 1977

[54] APPARATUS FOR FORMING CORRUGATIONS OF "ZERO" PITCH IN COAXIAL CABLE

[75] Inventors: Joseph R. Toma, Colonia; Oliver C. Johnson, Irvington, both of N.J.

[73] Assignee: Astrolab, Inc., Linden, N.J.

[21] Appl. No.: 630,035

[22] Filed: Nov. 7, 1975

[51] Int. Cl.² .................. B21J 15/12; B21D 15/06
[52] U.S. Cl. .......................... 72/78; 72/100; 72/114
[58] Field of Search .......... 72/77, 78, 98, 100, 72/121, 114

[56] References Cited
U.S. PATENT DOCUMENTS

| | | | |
|---|---|---|---|
| 581,459 | 4/1897 | Goddu | 72/78 |
| 3,323,339 | 6/1967 | Mattil | 72/78 |
| 3,572,074 | 3/1971 | Holdup | 72/77 |
| 3,648,502 | 3/1972 | Klug | 72/78 |
| 3,672,196 | 6/1972 | Levacher | 72/77 |

FOREIGN PATENT DOCUMENTS 1,936,894  2/1971  Germany ........................... 72/77

*Primary Examiner*—Leon Gilden
*Attorney, Agent, or Firm*—Gottlieb, Rackman & Reisman

[57] ABSTRACT

An apparatus for forming corrugations of "zero" pitch in coaxial cable includes a takeup drum which pulls the coaxial cable through a three jaw chuck or head at a speed related to the rotation of the head. The head includes three forming dies and three synchronizing gears which cooperate with the forming dies to synchronize movement of the forming dies for movement about the cable. By causing the takeup drum to pull the cable through the head at a predetermined rate, the forming dies cut parallel corrugations or "zero" pitch grooves in the cable jacket.

10 Claims, 8 Drawing Figures

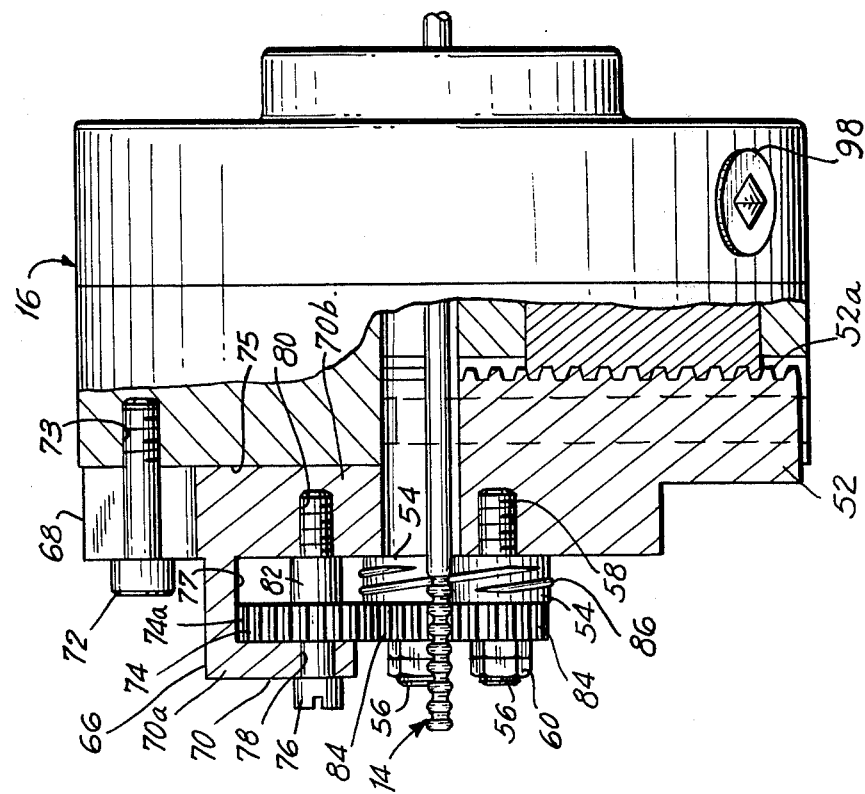
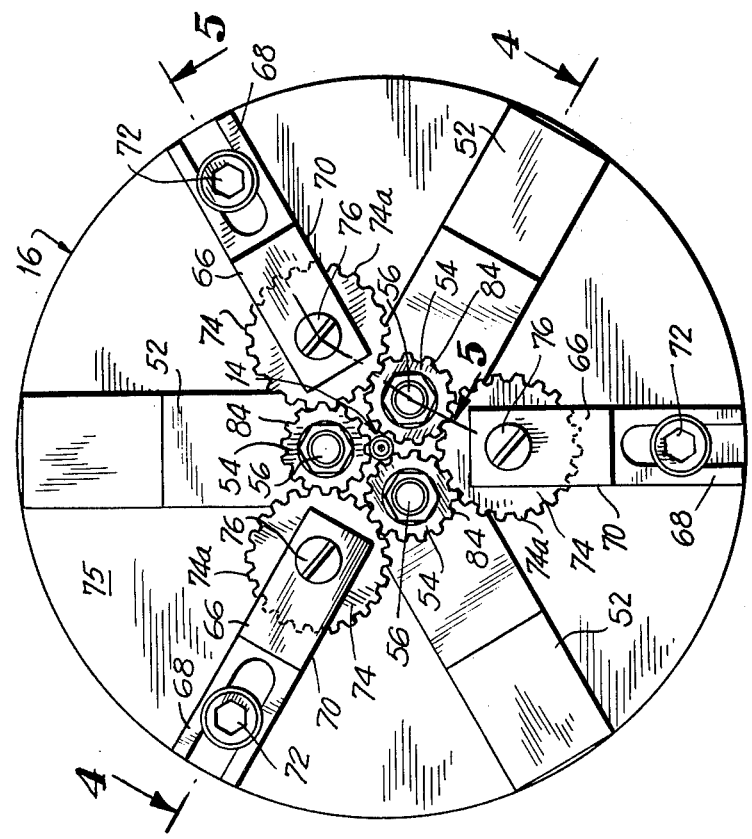

APPARATUS FOR FORMING CORRUGATIONS OF "ZERO" PITCH IN COAXIAL CABLE

This invention relates generally to coaxial cable and, more particularly, to an apparatus for forming corrugations of "zero" pitch in coaxial cable.

The existence of coaxial cables having an outer jacket formed with a plurality of grooves or corrugations is generally old in the art. By way of example, in U.S. Pat. No. 2,890,263 and in the U.S. Pat. No. 3,582,536 there are disclosed coaxial cables having corrugated or grooved outer jackets or outer conductors. These corrugations are usually provided to allow the coaxial cable to be flexed or bent.

It has been found to be particularly advantageous to provide a coaxial cable having an outer jacket formed with corrugations or grooves which are "parallel", i.e., which have "zero" pitch. Not only is such a coaxial cable more flexible than cables formed with helical (non-zero pitch) corrugations, but their operation also tends to be superior in that changes in phase, if the cable is stretched, is less likely to occur with coaxial cables having parallel corrugations or zero pitch.

Although the advantages of providing a coaxial cable with zero pitch corrugations have been generally recognized, apparatus for manufacturing such a cable have been found to be wanting in terms of operation, efficiency and end product. Of course, there is shown in the prior art apparatus for providing helical corrugations on tubing or the like. For example, there is disclosed in U.S. Pat. No. 3,387,477 an apparatus for forming flexible tubing which utilizes synchronized, helical forming rollers, to form helical grooves on an outside tubing or jacket of a gas line. Nonetheless, this patent is directed not to coaxial cable forming apparatus and does not provide parallel or zero pitch corrugations.

Accordingly, it is a broad object of the present invention to provide an apparatus for forming zero pitch corrugations or grooves in a coaxial cable.

Another object of this invention is to provide an apparatus for formng zero pitch corrugations in coaxial cable, which apparatus operates satisfactorily to provide the finished product.

Yet another object of this invention is to provide an apparatus for forming zero pitch corrugations in coaxial cable which operates efficiently and which is not unduly expensive.

These and other objects of the present invention are obtained by providing a three jaw chuck or head having a plurality of forming dies and a plurality of synchronizing gears for synchronizing rotation of the forming dies. Each forming die includes a helical thread for indenting the outer jacket of the coaxial cable to form the parallel or zero pitch corrugations thereon. A take-up drum pulls the coaxial cable through the head in a manner such that the cable linear displacement is equal to the longitudinal displacement of a point on the thread of the forming die. In operation, the head is rotated, along with the takeup drum, and the interaction of the forming dies with the outer jacket of the coaxial cable causes the forming dies to rotate about the outer jacket. By synchronizing the rotation of the forming dies, by rotating the head and the takeup drum in a predetermined relationship and by choosing the pitch of the helical thread on the forming die, the cable exiting from the head will have corrugations of zero pitch.

The above brief description will be more fully appreciated by reference to the following detailed description of a preferred, but nonetheless illustrative, embodiment of the present invention, when taken in conjunction with the following detailed drawings, wherein:

FIG. 3 is an end view, enlarged in scale, showing the head or chuck assembly used in the apparatus of the present invention;

FIG. 4 is a sectional view, taken substantially along the line 4—4 of FIG. 3;

Figure 1:
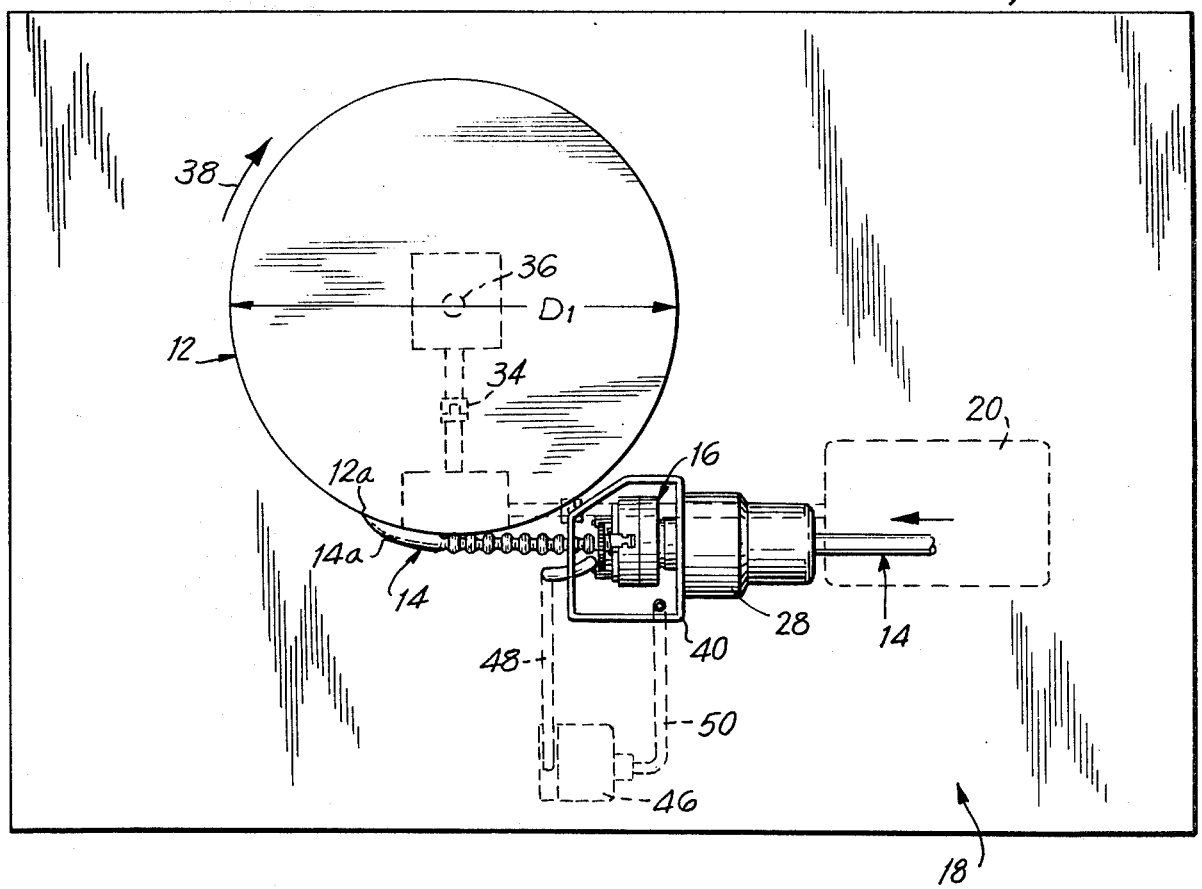
FIG. 1 is a top, plan view of the apparatus for forming coaxial cable with zero pitch, according to the present invention.
Figure 2:
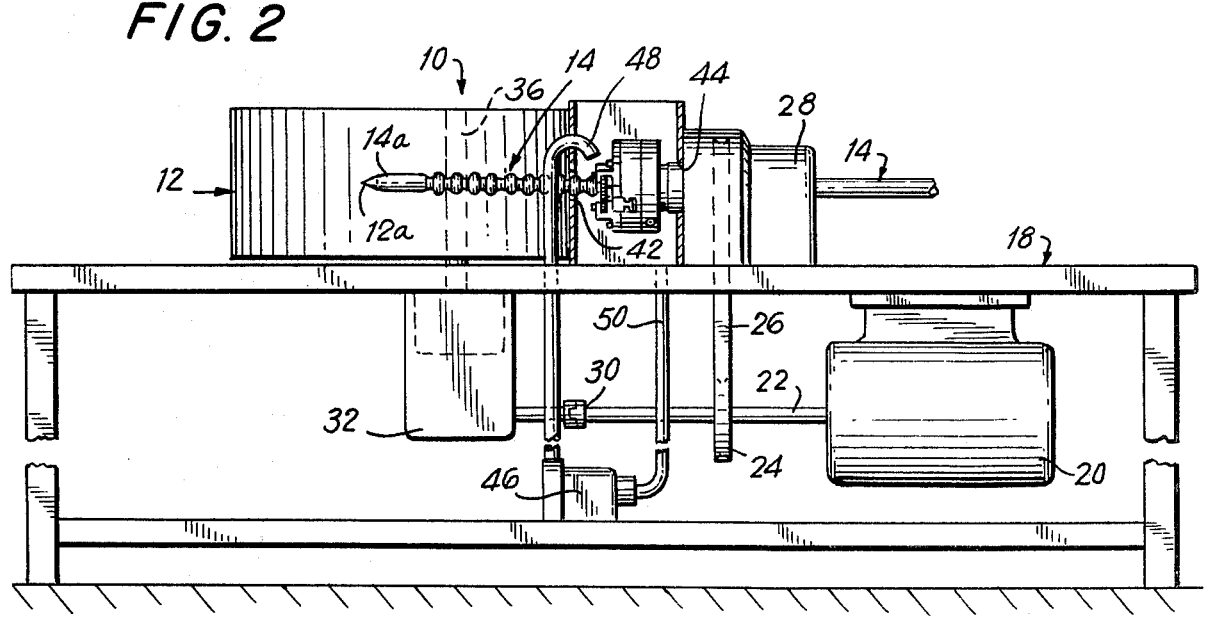
FIG. 2 is a side, elevation view of the apparatus of FIG. 1.

Referring now to the drawings and, more particularly, to FIGS. 1 and 2 thereof, the apparatus for forming zero pitch corrugations in coaxial cable is generally designated 10 and includes a cylindrical takeup drum 12 having a circumference defined by the diameter $D_1$ of the drum. The takeup drum is adapted to receive a coaxial cable 14, for example, by insertion of an end of the coaxial cable 14a into an appropriate aperture 12a defined midway along the cylindrical side wall of the drum. As will be explained hereinafter, the takeup drum functions to pull the coaxial cable 14 through a three-jaw chuck or head 16 at a speed whereby helical forming dies in the head form parallel corrugations, i.e., corrugations of zero pitch, in the outer jacket of the coaxial cable. The apparatus 10 may conveniently be located on the worktable 18 or other support, with the apparatus also including a drive motor 20 having a drive shaft 22 which causes head 16 and takeup drum 12 to rotate, as will be explained.

Specifically, a variable or adjustable pulley 24 is located on the driveshaft 22 and the pulley, via an endless belt 26, rotates head 16 through an appropriate gearing and support mechanism 28, as is generally known in the art. By varying pulley 24, the speed of rotation of head 16 may be varied. The drive shaft 22 is also connected, via an appropriate coupling 30, to a speed reducing mechanism 32. The output of the speed reducing mechanism is coupled, via an appropriate coupling 34 (see FIG. 1), to a drive shaft 36 which causes rotation of the takeup drum in a clockwise direction as indicated by arrow 38 of FIG. 1.

It will be appreciated that in operation head 16 rotates or revolves at a much greater rate than the rotation of the takeup drum 12. By way of example, the apparatus generally described above is set to enable head 16 to rotate approximately 2,000 to 2,100 times for each revolution of the takeup drum. This ratio of number of head revolutions to number of takeup drum revolutions is defined as the head-to-drum ratio. By choosing the proper head-to-drum ratio, among other variables, the apparatus 10 operates to form coaxial cable having parallel corrugations or zero pitch.

As also shown in FIGS. 1 and 2, apparatus 10 includes an upstanding shield 40 which is open at the top and in which is defined two apertures 42 and 44 which enable the cable to pass through the shield. Shield 40 acts as a safety shield and also serves as a splash shield for a coolant fluid (not shown) which is pumped onto head 16 by an appropriate pump mechanism 46. The pump 46 pumps the liquid through coolant spout 48 (which also fits through an aperture in the shield), with the fluid from the spout falling onto the head as a lubricant-coolant. The fluid is returned to pump 46 by way of a return line 50.

FIGS. 3-6 illustrate the details of head 16. Specifically, head 16 includes three jaws 52, disposed at 120° from each other about head 16. The three jaws are identical, with each jaw including a set of teeth 52a (see FIG. 4) which are adapted to cooperate with corresponding teeth in head 16 so that the jaws may be tightened, as is generally known. The jaws 52 support helical forming dies 54 which are illustrated in greater detail in FIG. 6. One such helical forming die is carried by each jaw 52.

Figure 5:
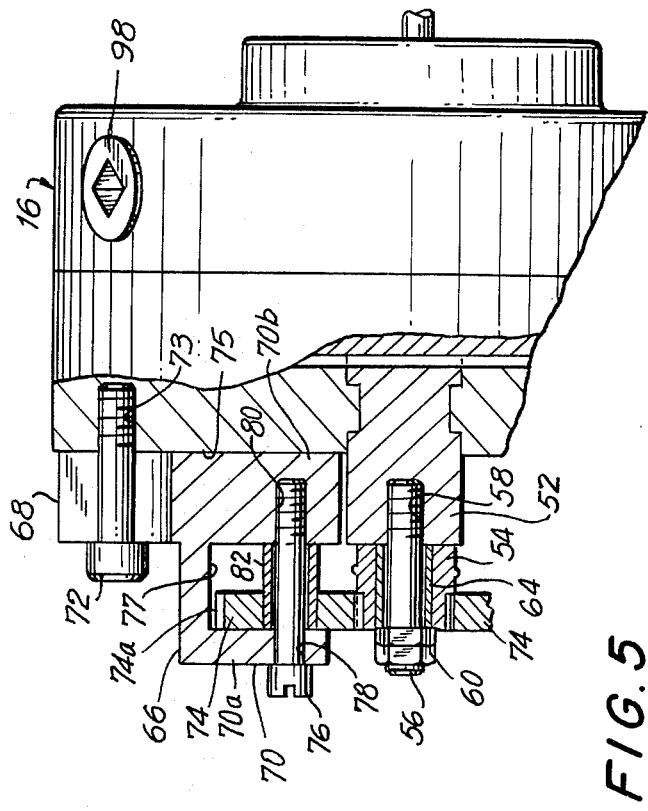
FIG. 5 is a partial sectional view, taken substantially along the line 5—5 of FIG. 3.

As indicated most clearly in FIGS. 4 and 5, a helical forming die 54 is secured to its corresponding jaw 52 by an appropriate fastening element, such as by an axle screw 56, and the axle screw is threaded into jaw 52, at aperture 58 defined in the jaw. Appropriate fastening elements, for example, nuts 60, maintain the axle screw 56 in place, with the axle screw passing through an aperture or passageway 62 defined in the forming die (see FIG. 6). In order to allow the forming die 54 to rotate about axle screw 56, while still maintaining the forming die as a whole in place, a bushing 64 may be inserted into forming die aperture 62, with the bushing 64 surrounding the axle screw. Thus, it will be appreciated that the axle screw 56 and bushing 64 act in combination to provide an axis of rotation about which the helical forming die 54 rotates, while at the same time these elements prevent axial shifting of the forming die as a whole, relative to the head.

Head 16 also includes three yokes 66, which are secured to head 16 at 120° from each other, and intermediate the respective jaws 52 of the head (see FIG. 3). Each yoke defines a U-shaped section 68 and a synchronizing gear supporting section 70. The yokes 66 are received in corresponding locating slots (not shown) which are cut in the face of head 16 and are maintained in the slots by appropriate fastening elements, for example, by bolts 72 which clamp the ears of the U-shaped section 68 against the head face, with the bolts inserted into appropriate openings 73 which are defined in face 75 of head 16. Of course, other means for attaching yokes 66 to the face of head 16 may be provided, if desired.

The synchronizing gear supporting sections 70 of yokes 66 define U-shaped synchronizing gear supporting cavities 77. One synchronizing gear 74 is located for rotational movement within each cavity 77. Specifically, and as shown most clearly in FIGS. 3, 4 and 5, each synchronizing gear supporting cavity 77 supports a synchronizing gear 74, by way of an axle screw 76 which is disposed through an appropriate aperature 78 in one wall 70a of yoke section 70, with its other end being threaded and disposed in an appropriate threaded opening 80 in opposite wall 70b of the yoke section (see FIGS. 4 and 5). Bushings 82 are advantageously provided, with each bushing extending between walls 70a and 70b, so that the synchronizing gears 74 are free to rotate about the axle screws 76, within the supporting cavities 77 of yoke section 70.

As shown in FIG. 3, each synchronizing gear includes a series of teeth 74a which extend out of the synchronizing gear supporting cavities 77. The teeth 74a are adapted to mesh or otherwise cooperate with corresponding teeth 84 carried by the helical forming dies 54 (see also FIG. 6). As shown most clearly in FIG. 3, the teeth 74a of a single synchronizing gear 74 are adapted to mesh with the teeth 84 of two helical forming dies. Thus, it will be appreciated that the cooperation of the three synchronizing gears 74 with the three forming dies 54 synchronizes the rotation of the three helical forming dies.

Figure 6:
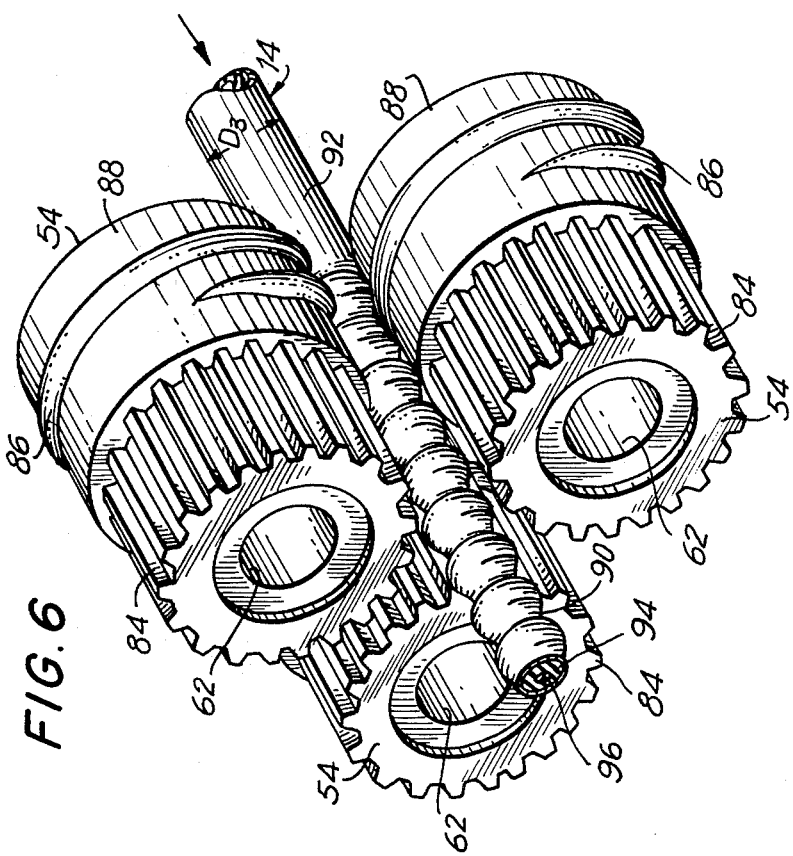
FIG. 6 is a schematic, perspective view showing the travel of coaxial cable past the forming dies in the apparatus of the present invention.
Figure 8:
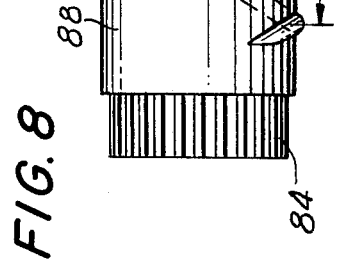
FIG. 8 is a side view showing another, alternative forming die useful in the apparatus of the present invention.
Figure 7:
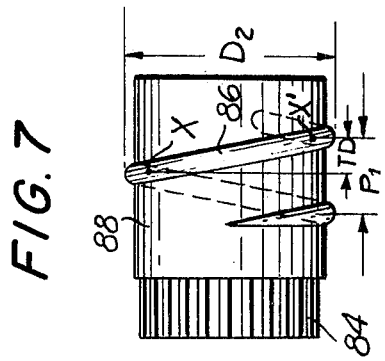
FIG. 7 is a side view showing a forming die useful in the apparatus of the present invention.

Referring now particularly to FIGS. 6, 7 and 8, it will be noted that each helical forming die is formed to include a helical die thread 86 which is disposed about a generally cylindrical portion 88 of the forming die. The die thread defines an outer diameter $D_2$ for the helical die and also is of a predetermined pitch, i.e., determined by the "slant" of the die thread about cylindrical body 88. In FIG. 7, the pitch is defined as $P_1$ while in FIG. 8, the pitch is defined as $P_2$. The cooperation of the three die threads 86, one on each of the helical forming dies 54, "cut" the parallel corrugations or grooves 90 in the outer conductor or jacket 92 of a cable 14, as the cable passes through the three helical forming dies. The coaxial cable 14, which also includes a dielectric layer 94 and an inner conductor 96, is thus formed with zero pitch or parallel corrugations 90 formed in outer jacket 92, and this provides a coaxial cable which is flexible and not prone to phase changes, as the coaxial cable is stretched.

Having now generally described the structure of the apparatus for forming zero pitch corrugations on a coaxial cable, the operation of apparatus 10 will now be explained.

Specifically, with the three helical forming dies 54 loosened, a coaxial cable 14, which already is formed to include an inner conductor 96, a dielectric 94 and an outer jacket, is inserted through head 16, and one end 14a of the cable is attached to takeup drum 12. The jaws 52, which carry the three helical forming dies, are tightened, for example, by turning an appropriate adjustment screw 98. This causes the die threads 86 of the three helical forming dies to bite into and indent the outer jacket 92 of the coaxial cable. Two of the yokes 66 carrying two synchronizing gears 74 are then pre-set. The third yoke is then adjusted in its slot (not shown) to properly mesh its synchronizing gear with the helical forming dies 54.

When power is applied to motor 20, the drive shaft 22 transmits power to the speed reducer 32, causing rotation of takeup drum 12. This, in turn, starts to draw the cable 14 through head 16. At the same time, the drive shaft 22 causes the head 16 to rotate. Since the helical forming dies are in close contact with jacket 92 of the coaxial cable, the three forming dies are caused to rotate about the cable jacket at the same time that the head, as a whole, is rotating (the cable does not rotate, but only moves longitudinally through the head). In other words, as the head 16 rotates around the cable, the helical forming dies also rotate relative to the head and the cable. For example, if X is a point on thread 86 in contact with cable 14, then as head 16 rotates one revolution, die 54 will also rotate so that the point of contact with the cable is now at X'. The distance between X and X' is defined as the thread linear displacement, TD.

The pre-selected combination of speed reducers 32 and the variable pitch pulley 24 establishes a relationship between the speed or rotation of the takeup drum 12 and the speed or rotation of head 16. This relationship, the head-to-drum ratio, has a significant bearing on forming the parallel corrugations or zero pitch grooves in the coaxial cable.

This relationship may be explained as follows:

It will be appreciated that the pitch of the corrugations formed in the jacket of the coaxial cable will depend on the speed at which the cable is drawn through the head by the takeup drum and the relative movement of the forming dies about the cable jacket. The latter movement is a function of the outer diameter of the cable jacket ($D_3$), the outer diameter of the forming die ($D_2$), the pitch of the die threads (P) and the number of revolutions of the head; while the speed at which the cable is pulled through the head by the takeup drum depends on the circumference of the takeup drum and the number of revolutions of the drum.

It will also be appreciated that zero pitch or parallel corrugations can be formed only if the linear displacement of the cable through the head (a function of the takeup drum) is equal to the thread linear displacement (TD). Thus, unless the helical forming dies rotate about the cable jacket such that "point X" travels along the cable jacket at the same speed as the linear displacement of the cable, the corrugations or grooves formed in the cable jacket will not be of zero pitch.

By way of an illustrative, specific example, it has been found that for a cable jacket having a ¼ inch outer diameter ($D_3 = .250$ inch) and a helical forming die having a ¾ inch outer diameter ($D_2 = .750$ inch), the forming die will rotate ⅓ revolution for each head revolution. Where the pitch (P) of the helical threads is nine turns per inch, for each revolution of the head, the thread linear displacement is 0.037 inch (1/9 ÷ 3). For zero pitch, the takeup drum would thus also have to pull the cable through the head at 0.037 inch per head revolution. This establishes the head-to-drum ratio as 2037 to 1 for a takeup drum diameter of 24 inches. This is because for a diameter of 24 inches, the takeup drum circumference is 75.4 inches and the head must turn 75.4 inches ÷ .037 inch or 2037 times for 1 revolution of the takeup drum. In other words, the head must rotate approximately 2100 times for each revolution of the takeup drum in order for the cable to move through the head such that the forming dies "cut" zero pitch grooves.

Thus, the present invention, by coordinating the action of the takeup drum to the thread linear displacement enables the individual threads on the helical forming dies to cut zero pitch corrugations. The variables which determine the necessary head-to-drum ratio are the circumference, i.e., diameter, and speed of the takeup drum, the diameters of the cable jacket and forming dies and the pitch of the forming die threads.

By varying these parameters, the "threads" on the forming dies may either "cut" separate grooves or corrugations or they may "cut" the same grooves thereby reinforcing each other to provide rounder or better-shaped corrugations or two threads may reinforce each other while the third thread may form a separate groove. For example, the helical thread on forming die 54 of FIG. 7 has a pitch $P_1$ which is useful in providing "reinforced" corrugations, while the pitch $P_2$ of die 54 of FIG. 8 is adapted to "cut" only a single groove, separate from the threads of the other forming dies. As a general rule, it is more advantageous for the threads to reinforce each other and cut the same grooves since this means that the cable is drawn through the head at a slower speed with less heat generated thereby minimizing the effect of work hardening.

Obviously, proper operation of the apparatus can result only if the forming dies are initially "set" properly and are then kept in synchronization with each other. As indicated before, the dies are kept in synchronization by the synchronizing gears. The dies may be initially "set" in proper relationship by trial and error or by inserting an already formed die gage having zero pitch into the head and lining up the threads properly in the grooves already formed in the gage.

Obviously, numerous modifications are possible in light of the above disclosure. For example, the apparatus may be used to form zero pitch corrugations in other than cables, i.e., in tubing or the like. It is to be understood, therefore, that the above-described embodiment is merely illustrative and other embodiments may be devised by those skilled in the art without departing from the spirit or scope of the present invention, as set forth in the appended claims.

What we claim is:

1. An apparatus for forming parallel corrugations in a circular member comprising a head, means including a takeup drum for pulling the circular member through the head, drive means for rotating the head and the takeup drum, said head including a plurality of forming dies mounted for rotation relative to said circular member, each of said forming dies including a single turn helical die thread adapted to indent said circular member, means for synchronizing movement of said forming dies in unison about said circular member, said takeup drum pulling said member through said head such that the linear displacement of the circular member through the head is substantially equal to the linear displacement of the helical thread relative to said circular member thereby enabling said forming dies to form parallel corrugations in said circular member.

2. An apparatus for forming parallel corrugations in a circular member according to claim 1 wherein said head includes a plurality of jaws one for each of said forming dies, means for tightening at least one of said jaws to cause said die threads to indent said circular member, and means for connecting said forming dies to said jaws and for enabling said forming dies to rotate relative to said jaws.

3. An apparatus for forming parallel corrugations in a circular member according to claim 2 wherein said means for synchronizing movement of said forming dies includes a plurality of synchronizing gears adapted to mesh with said forming dies.

4. An apparatus for forming parallel corrugations in a circular member according to claim 3 wherein said head further includes a plurality of yokes one for each of said synchronizing gears, and means for mounting said synchronizing gears for rotation relative to said yokes.

5. An apparatus for forming parallel corrugations in a circular member according to claim 4 wherein said yokes each include a synchronizing gear cavity for receiving a synchronizing gear, said synchronizing gears protruding from said gear cavities.

6. An apparatus for forming parallel corrugations in a circular member according to claim 4 wherein one of said synchronizing gears meshes with two of said forming dies.

7. An apparatus for forming parallel corrugations in a circular member according to claim 1 wherein said drive means further includes means for varying the rate of rotation of said head.

8. An apparatus for forming parallel corrugations in a circular member according to claim 1 wherein said drive means further includes means for varying the rate of rotation of said takeup drum.

9. An apparatus for forming parallel corrugations in a circular member according to claim 1 wherein said drive means includes means for varying the rate of rotation of said takeup drum and the rate of rotation of said head.

10. An apparatus for forming a parallel corrugations in a coaxial cable comprising a head, a takeup drum for pulling the cable through said head, said head including three jaws and three yokes, said jaws disposed 120° from each other about the face of the head and said yokes disposed 120° from each other and 60° from said jaws about the face of the head, three forming dies each of which includes a single turn helical die thread adapted to indent said cable, means for mounting said forming dies to said jaws so that one forming die is rotatably mounted on one jaw, means for tightening at least one of said jaws to cause said helical die threads to indent said cable, three synchronizing gears, means for rotatably mounting said synchronizing gears for movement relative to yokes whereby one of said synchronizing gears meshes with two of said forming dies to synchronize movement of said forming dies about said cable, and drive means for rotating said takeup drum and said head including means for setting the ratio of number of head revolutions to number of takeup drum revolutions such that the linear displacement of the cable through the head is substantially equal to the linear displacement of the helical threads relative to said cable thereby enabling said forming dies to form parallel corrugations in said cable as the die threads cut grooves therein.

* * * * *